(12) United States Patent
Kalashnikov

(10) Patent No.: US 6,302,055 B1
(45) Date of Patent: Oct. 16, 2001

(54) HALO REDUCING INSTRUMENT POINTER ILLUMINATING APPARATUS

(75) Inventor: Sergei Kalashnikov, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/407,400

(22) Filed: Sep. 28, 1999

(51) Int. Cl.[7] ..................................... G01D 11/28
(52) U.S. Cl. .............................. 116/288; 116/286; 362/26
(58) Field of Search ........................... 116/286, 287, 116/288, 300, 301, 302, 303, 328, 332; 362/23, 26–32

(56) References Cited

U.S. PATENT DOCUMENTS

| | | |
|---|---|---|
| 4,380,043 | 4/1983 | Takamatsu et al. . |
| 4,771,368 * | 9/1988 | Tsukamoto et al. ................. 362/29 |
| 4,860,170 | 8/1989 | Sakakibara et al. . |
| 5,199,376 * | 4/1993 | Pasco ................................. 116/288 |
| 5,291,851 * | 3/1994 | Muramatsu ......................... 116/286 |
| 5,458,082 * | 10/1995 | Cookingham ...................... 116/288 |
| 6,161,934 * | 12/2000 | Griffin et al. ....................... 362/26 |

FOREIGN PATENT DOCUMENTS

| | | |
|---|---|---|
| 07997215 | 9/1997 | (EP) . |
| 6-186063 * | 7/1994 | (JP) ..................................... 116/288 |
| 11211513 | 8/1999 | (JP) . |
| 11248493 | 9/1999 | (JP) . |

* cited by examiner

Primary Examiner—Andrew H. Hirshfeld
(74) Attorney, Agent, or Firm—Larry I. Shelton

(57) ABSTRACT

An instrument pointer illuminating apparatus for illuminating instrument pointers includes a light conductive member (24) having a first shaft aperture (22) and an instrument face (28) disposed on a front surface of the light conductive member and having a second shaft aperture (26) therein. A pointer shaft (20) extends through the first and second shaft apertures beyond the front surface of the light conductive member and includes an instrument pointer (30) disposed on the pointer shaft. A light blocking hub cap (34) is mounted on the hub portion (43) of the instrument pointer and includes a center portion (50) and a cylindrical wall portion (52) extending from the center portion of the hub cap toward the instrument face where it terminates at a first end (54) below the instrument pointer. A recessed well (36) is located in the light conducting member, the recessed well being generally coaxial with the first shaft aperture and having a well wall (39) extending upward from a bottom of the recessed well and terminating at a second end (58) substantially flush with the instrument face so as to reduce light transmission therethrough.

12 Claims, 2 Drawing Sheets

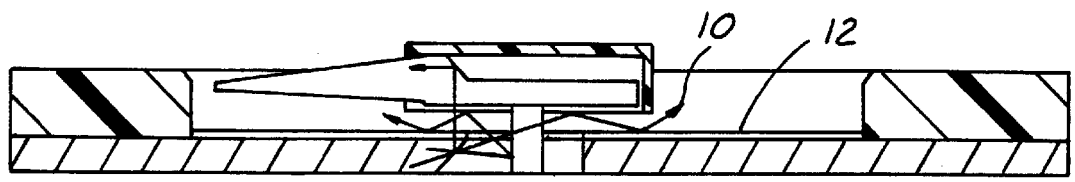
(PRIOR ART) FIG. 1
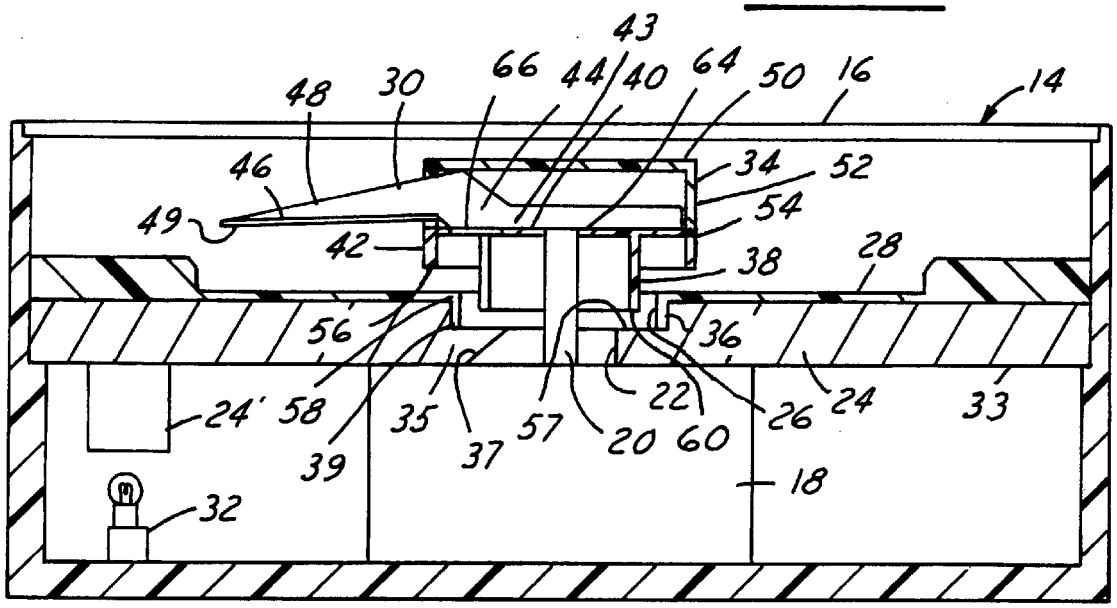
FIG. 2
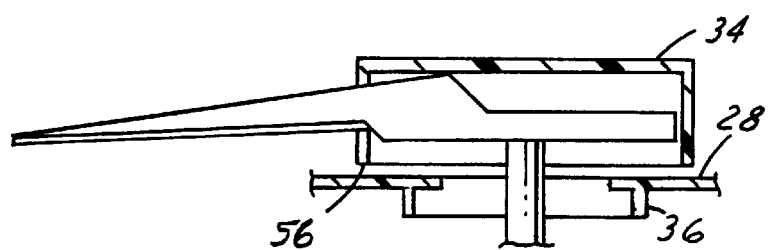
FIG. 3
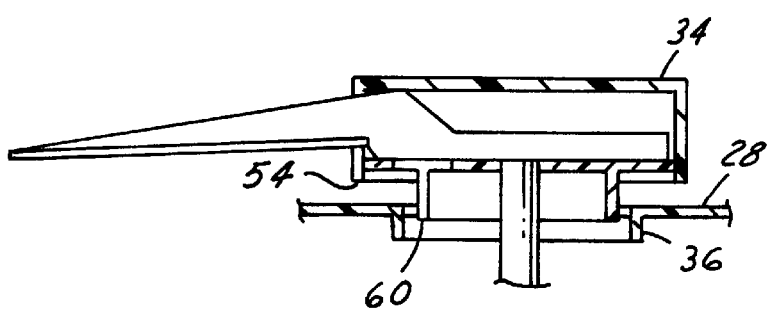
FIG. 4

HALO REDUCING INSTRUMENT POINTER ILLUMINATING APPARATUS

BACKGROUND OF THE INVENTION

1. Field of the Invention

The present invention relates to an apparatus for illuminating instrument pointers. More particularly, light is conducted through the pointers without creating a disturbing halo image on the instrument face.

2. Disclosure Information

It is known to provide for illuminated pointers for instruments, as shown in FIG. 1, in which pointers are illuminated by reflectively transmitting light into the pointer. In such instruments, a portion of the light emitted to illuminate the pointer is "lost" through reflections 10 which leak onto an instrument face 12, creating the appearance of a glowing halo on the instrument face. The halo reduces the clarity and readability of any markings on the instrument.

It would be desirable to have an illuminated pointer for instruments capable of significantly reducing or eliminating this halo.

SUMMARY OF THE INVENTION

An instrument having an illuminated pointer has been discovered that substantially reduces or eliminates any observable halo. The present invention includes a light conductive member having a first shaft aperture and an instrument face disposed on a front surface of the light conductive member and having a second shaft aperture therein. A pointer shaft extends through the first and second shaft apertures beyond the front surface of the light conductive member and includes an instrument pointer disposed on the pointer shaft. A light blocking hub cap is mounted on the hub portion of the instrument pointer and includes a center portion and a cylindrical wall portion extending from the center portion of the hub cap toward the instrument face where it terminates at a first end below the instrument pointer. A recessed well is located in the light conducting member, the recessed well being generally coaxial with the first shaft aperture and having a well wall extending upward from a bottom of the recessed well and terminating at a second end substantially flush with the instrument face so as to reduce light transmission therethrough.

An advantage of the present invention to substantially reduce or eliminate the halo created on an instrument face as an undesired byproduct of illuminating an instrument pointer.

BRIEF DESCRIPTION OF THE DRAWINGS

FIG. 1 is a sectional side view of an illuminated instrument pointer producing a halo image on an instrument face.

FIG. 2 is a sectional side view of one embodiment of an instrument pointer illuminating apparatus for illuminating an instrument pointer according to the present invention.

FIG. 3 is a sectional side view of another embodiment of an instrument pointer illuminating apparatus for illuminating an instrument pointer according to the present invention.

FIG. 4 is a sectional side view of another embodiment of an instrument pointer illuminating apparatus for illuminating an instrument pointer according to the present invention.

DETAILED DESCRIPTION OF THE PREFERRED EMBODIMENTS

Figure 6:
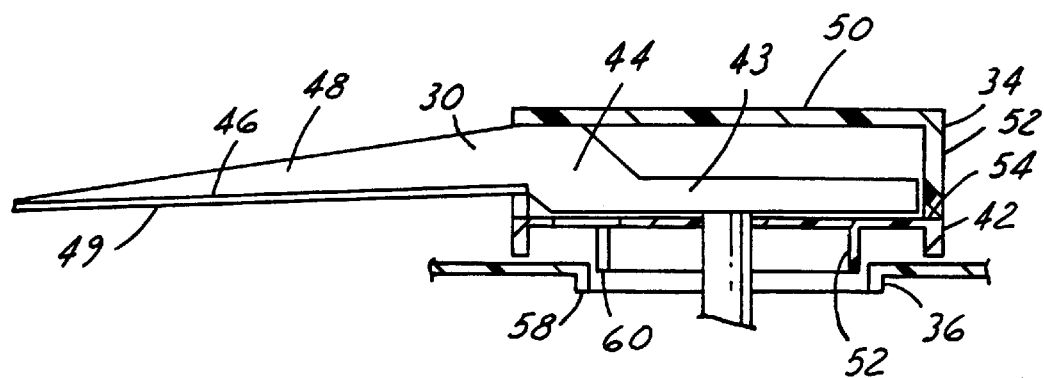
FIG. 6 is a sectional side view of another embodiment of an instrument pointer illuminating apparatus for illuminating an instrument pointer according to the present invention.

Referring now to FIGS. 2 and 6, an apparatus for illuminating instrument pointers in accordance with the present invention is shown. The apparatus is provided with an enclosure 14 having a transparent viewing window 16, housing therein at least one instrument. The instrument includes a pointer driver 18 mounted within the enclosure 14 and having a pointer shaft 20 extending through a first aperture 22 in a light conductive member 24 and a second aperture 26 in an instrument face 28, which overlays the light conductive member 24. An instrument pointer 30, driven by the pointer driver 18 through the pointer shaft 20, is illuminated by light transmitted from a lamp 32 into the light conductive member 24 through a light collecting extension 24'. It should be noted that the enclosure 14 could include numerous illuminated and non-illuminated instruments, such as are found in the instrument panel of a motor vehicle.

The present invention eliminates or substantially reduces any visible halo by using individual or a combination of baffles together with a light blocking hub cap 34 positioned to block reflected light from reaching the instrument face 28. The baffles, which will be described in greater detail below include a recessed well 36 preferably having a light blocking well wall 39, a light blocking baffle wall 38, a light blocking baffle shield 40 and a light blocking cylindrical wall extension 42. To improve the readability of the specification, further reference to these features throughout this description will be without recitation of their "light blocking" nature, it being understood that they possess the physical characteristic of being relatively or completely non-transparent.

The light conductive member 24 is made of a transparent material such as polycarbonate. The light conductive member 24 includes the light collecting extension 24', which in the illustrated embodiment is merely an extension of the bottom surface 33 of the light conductive member 24. The light conductive member 24 also includes a light transmitting section 35 disposed on at least a portion of the periphery of the first aperture 22. The light transmitting section 35 includes a beveled surface 37 formed to reflect light toward the instrument pointer 30. Alternatively, while not shown, the pointer could be directly illuminated, such as by an LED aligned with the instrument pointer.

The instrument face 28 may be constructed by bonding a mask onto an upper surface of the light conductive member 24, or, alternatively, the instrument face could be painted onto upper surface of the light conductive member. Essentially, the instrument face 28 includes areas where light transmission is substantially blocked and other areas where light transmission is allowed, thereby illuminating characters and various shapes to form dial faces and characters thereon. The instrument face 28 extends to the periphery of the light conductive member 24 to prevent light leakage at the joint of the enclosure 14 and the light conductive member 24. The instrument face 28 does not block the light transmitting section 35 of the light conductive member 24.

Figure 5:
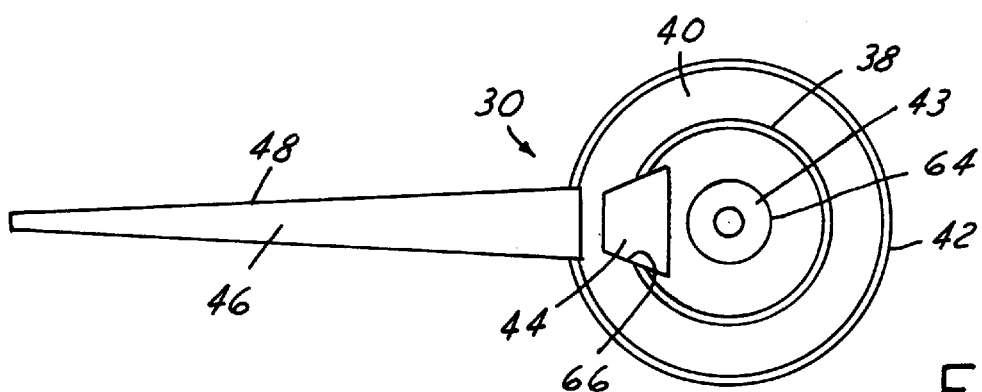
FIG. 5 is a plan view of an illuminated instrument pointer for use in an instrument pointer illuminating apparatus in accordance with the present invention.

Referring now to FIGS. 2, 5 and 6, the instrument pointer 30 includes a hub portion 43 mechanically interconnected, preferably in a press-fit manner, to the pointer driver 18 by the pointer shaft 20. The instrument pointer includes a light receiving portion 44 arranged to be above the light transmitting section 35 of the light conductive member 24, preferably throughout its range of motion, so as to provide consistent illumination of the instrument pointer. A bottom surface 46 of the needle portion 48 of the instrument pointer 30 is also covered with a light blocking mask 49, formed by printing, painting or bonding a light blocking material thereon, to prevent light from the instrument pointer from reflecting downward onto the instrument face 28.

The hub cap 34 is snap-fit or bonded onto the hub portion 43. The hub cap 34 is constructed of a non-transparent, closed cylinder including a center portion 50 and a cylindrical wall portion 52 extending downward from the center portion 50 toward the instrument face 28 and terminating at a first end 54 (more distinctly visible in FIG. 4), generally just below the bottom surface 46 of the needle portion 48 of the instrument pointer. As shown in FIG. 2, the hub cap 34 includes the cylindrical wall extension 42 extending from the first end 54 further downward toward the instrument face and terminating at a fourth end 56.

The recessed well 36 is formed in the light conducting member 24 and is generally coaxial with the first aperture. The recessed well 36 is preferably sized smaller than the hub cap 34, allowing the hub cap to completely cover the recessed well 36. The recessed well 36 includes the well wall 39 extending upward from a bottom 57 of the recessed well 36 and terminating at a second end 58 substantially flush with the instrument face. Depending on the diameter of the recessed well, it may not be in the form of a circle, however, such a shape is desirable to prevent undesirable reflections from being generated from non-circular shapes. The well wall 39 is preferably covered with a light blocking mask. Alternatively, the well wall 39 does not include a light blocking mask.

The baffle wall 38 extends downward from the bottom of the hub portion 43 of the instrument pointer 30 a predetermined height and terminates at a third end 60, preferably falling below, or at least as close as possible to, the second end 58 of the well wall 39 of the recessed well 36. Depending on the diameter of the baffle wall, it may not form a closed loop so as not to block light transmission between the light transmitting section 35 and the light receiving portion 44 of the instrument pointer. Additionally, the baffle wall may not form a circular shape, rather it could simply be two or more relatively planar baffle walls positioned to provide as much blockage of light reflection as is possible. Preferably, however, the baffle wall 38 will be sized such that it will form a completely closed loop and fall within the area defined by the recessed well 36. The baffle wall can be either a formation of the instrument pointer itself or a separate part bonded to the instrument pointer, in the case where the baffle shield is present, it can be an extension integrally formed therewith.

The baffle shield 40 matches the bottom of the hub portion of the instrument pointer, generally, but is not necessarily planar, and extends radially outward to and engages in a secure and light sealing manner the cylindrical wall portion of the hub cap. The baffle shield includes a third shaft aperture 64 for receiving the pointer shaft therethrough and also includes a light transmitting window 66 for conducting light into the light receiving portion 44 of the instrument pointer from the light transmitting section 35 of the light conductive member 24.

In the simplest forms of illuminated instruments, light emitted from the lamp 32 enters the light conductive member 24, to be reflected upwards by the beveled surface 37 of the light transmitting section 35 into the a light receiving portion 44 of the illuminated pointer. In the embodiment illustrated in FIG. 2, the recessed well and the baffle, in their overlapping relationship with each other, prevent light leakage outside of the hub cap area, thus preventing the undesirable image of a halo on the instrument face.

Referring now to FIGS. 3, 4 and 6, alternative embodiments of the present invention are illustrated, all demonstrating significant reductions in the halo. FIG. 3, illustrates an embodiment having the fourth end 56 of the cylindrical wall extension 42 extending downward as close as possible to the instrument face in combination with the recessed well 36 to reduce light leakage paths. In this embodiment, the instrument face 28 extends partially over the recessed well 36 to further reduce halo.

FIG. 4 illustrates yet another embodiment of the present invention, wherein the baffle shield and baffle wall are implemented together with the recessed well 36. The third end 60 of the baffle wall extends downward to a position below the second end of the well wall. In this embodiment, it is preferred, but not required, that the baffle wall be configured as a completely closed circumference, with the light transmitting section and the light receiving portion falling completely within this closed circumference, to provide maximum halo reduction.

The foregoing description presents several embodiments of the present invention. Details of construction have been shown and described for purposes of illustration rather than limitation. For example, it should be recognized to those skilled in the art that illuminated instruments can be used in many applications beyond the instrument panel of a motor vehicle. In other applications, considered within the scope of the present invention, it is common to find multiple pointers driven on a common instrument. Other modifications and alterations of the invention will no doubt occur to those skilled in the art that will come within the scope and spirit of the following claims.

I claim:

1. A halo reducing instrument pointer illuminating apparatus comprising:

a light conductive member having a first shaft aperture;

an instrument face disposed on a front surface of said light conductive member and having a second shaft aperture;

a pointer shaft extending through said first and second shaft apertures beyond said front surface of said light conductive member;

an instrument pointer including a hub portion disposed on said pointer shaft;

a light blocking hub cap mounted on said hub portion of said instrument pointer, said light blocking hub cap including a center portion and a wall portion extending from said center portion of said hub cap toward said instrument face and terminating at a first end below said instrument pointer;

a recessed well disposed in said light conductive member, said recessed well being generally coaxial with said first shaft aperture;

said recessed well having a well wall extending upward from a bottom of said recessed well and terminating at a second end substantially adjacent to said instrument face; and a light blocking baffle wall disposed on and extending away from said instrument pointer toward said instrument face and terminating at a third end within said recessed well.

2. The halo reducing instrument pointer illuminating apparatus according to claim 1, further comprises a wall extension integral with and extending from said first end of said wall portion to a fourth end adjacent to said instrument face.

3. The halo reducing instrument pointer illuminating apparatus according to claim 1, further comprises a light blocking baffle shield disposed on a bottom side of said instrument pointer and having a planar portion with a third shaft aperture for receiving said pointer shaft therethrough, said light blocking baffle shield extending radially outward to engage said wall portion of said light blocking hub cap.

4. The halo reducing instrument pointer illuminating apparatus according to claim 3, wherein said light blocking baffle shield further includes a light transmitting window in said baffle shield exposing a light receiving portion of said instrument pointer for reception of light from said light conductive member.

5. The halo reducing instrument pointer illuminating apparatus according to claim 1, wherein said light blocking baffle wall extends from a light blocking baffle shield disposed on a bottom side of said instrument pointer, said light blocking baffle shield having a planar portion with a third shaft aperture for receiving said pointer shaft therethrough, said light blocking baffle shield extending radially outward to engage said wall portion of said light blocking hub cap.

6. The halo reducing instrument pointer illuminating apparatus according to claim 1, wherein said instrument pointer is light conductive such that light from said light conductive member illuminates said instrument pointer.

7. The halo reducing instrument pointer illuminating apparatus according to claim 1 wherein said well wall includes a light blocking mask to reduce light transmission therethrough.

8. A halo reducing instrument pointer illuminating apparatus comprising:

- a light conductive member having a first shaft aperture;
- an instrument face disposed on a front surface of said light conductive member and having a second shaft aperture;
- a pointer shaft extending through said first and second shaft apertures beyond said front surface of said light conductive member;
- an instrument pointer, including a hub portion, disposed on said pointer shaft;
- a light blocking hub cap mounted on said hub portion of said instrument pointer, said light blocking hub cap including a center portion and a wall portion extending from said center portion of said hub cap toward said instrument face and terminating at a first end below said instrument pointer;
- a wall extension integral with and extending from said first end of said wall portion to a fourth end in close proximity to said instrument face;
- a light blocking baffle shield disposed on a bottom side of said instrument pointer and having a planar portion with a third shaft aperture for receiving said pointer shaft therethrough, said light blocking baffle shield extending radially outward to engage said wall portion of said light blocking hub cap; and
- a recessed well disposed in said light conductive member, said recessed well being generally coaxial with said first shaft aperture;
- said recessed well having a well wall extending upward from a bottom of said recessed well and terminating at a second end substantially adjacent to said instrument face; and
- a light blocking baffle wall which extends from said light blocking baffle shield toward said instrument face and terminating at a third end within said recessed well.

9. The halo reducing instrument pointer illuminating apparatus according to claim 8, further comprises a light transmitting section of said light conductive member.

10. The halo reducing instrument pointer illuminating apparatus according to claim 8, wherein said instrument pointer is light conductive such that light from said light conductive member illuminates said instrument pointer.

11. The halo reducing instrument pointer illuminating apparatus according to claim 8, wherein said light blocking baffle shield further includes a light transmitting window in said baffle shield exposing a light receiving portion of said instrument pointer for reception of light from said light conductive member.

12. The halo reducing instrument pointer illuminating apparatus according to claim 8, wherein said well wall includes a light blocking mask to reduce light transmission therethrough.

* * * * *